United States Patent [19]

O'Hare

[11] Patent Number: 4,873,061
[45] Date of Patent: Oct. 10, 1989

[54] FIXATION OF NITROGEN BY SOLAR ENERGY

[76] Inventor: Louis R. O'Hare, 1066 A County Rd. 335, Pagosa Springs, Colo. 81147

[21] Appl. No.: 143,371

[22] Filed: Jan. 13, 1988

[51] Int. Cl.$^4$ .................... C01B 21/24; C01B 21/30; F24J 2/26
[52] U.S. Cl. .................................. 422/188; 422/904; 126/449; 423/402; 423/405
[58] Field of Search ............... 423/402, 405, 400; 204/177, 178, 179; 422/186, 186.04, 904; 159/903; 126/449, 451

[56] References Cited

U.S. PATENT DOCUMENTS

| | | | |
|---|---|---|---|
| 3,958,553 | 5/1976 | Brantley, Jr. | 126/449 X |
| 4,177,794 | 12/1979 | Novinger | 126/449 X |
| 4,332,775 | 6/1982 | Genequand et al. | 422/186 X |
| 4,375,380 | 5/1983 | Genequand et al. | 126/449 X |
| 4,588,478 | 5/1986 | Warzel | 126/451 X |

*Primary Examiner*—John F. Terapane
*Assistant Examiner*—Susan Wolffe

[57] ABSTRACT

Mixtures of reactant gases containing nitrogen ar reacted by being raised to very high temperatures at the focal plane of a solar concentrator when radiant energy is absorbed by a metal screen or other porous material in contact with the reactants at the focal plane of a solar concentrator and the resulting products of combined nitrogen are rapidly cooled in a unique heat transfer unit which rapidly transfers the heat of the product gases to the reactant gases and the rapid cooling of the product fixes the high temperature equilibrium proportions to achieve larger proportions of product than would be possible by gradual cooling. The heat that is transferred from the product gases to a set of clusters of metal tubes during one period of a cycle is transferred from the tubes to reactant gases during a second period of the cycle by a reversal of gas flow direction through the tubes and through the screen, the reversal also causing a second set of tubes, which was cooled by the transmission of reactant gases to the screen in the first period, to absorb heat from the products during the second period with the effect that repeated reversal of gas flow direction provides a two part cycle in which one, then the other, set of tubes first absorbs product heat and later gives up the heat to preheat incoming reactant gases. The coaxial placement of the various sets of heat transfer tubes with their openings confronting and immediately adjacent to the screening the focal plane provides for very rapid cooling and removal of the product before it can undergo any gradual cooling.

15 Claims, 4 Drawing Sheets

FIXATION OF NITROGEN BY SOLAR ENERGY

In this invention solar energy is employed to fix atmospheric, molecular nitrogen by the conversion of solar radiation into thermal energy at very high temperatures. The high temperatures required are produced by a solar concentrator which focuses solar electromagnetic radiation onto an absorber which both converts the radiation into heat and contacts nitrogen and other reactant gases to heat the gases. The energy of activation to react nitrogen with other gases such as oxygen is provided principally by heat in the primary embodiment, but it is not intended to limit the basic inventive concept to activation by heat alone and the intense light energy that is available on the focal plane of the concentrator is employed in conjunction with a photocatalytic surface on the absorber in order to chemically absorb and react nitrogen with other gases such as oxygen in other embodiments which use solar energy both to heat reactant gas as well as to excite catalytic material in contact with the reactant gases.

Since temperatures of white heat are required to achieve significant concentrations of nitric oxide from mixtures of heated nitrogen and oxygen, a primary objective of the invention is to heat reactant gases as hot as possible. Another principal objective is to provide a means of very rapid cooling and removal of the extremely hot product gases. The reason for this objective is that the equilibrium proportions of product nitric oxide relative to reactant nitrogen and oxygen change greatly as temperature changes. When gradual cooling takes place the higher product concentrations found at higher temperatures diminish as the gas temperatures cool. For instance at 5000° K. twelve percent of an equal mixture of nitrogen and oxygen is converted to nitric oxide; whereas, at 3000° K. only three percent of the same mixture is nitric oxide. At 2000° K. there is less than one percent of nitric oxide at equilibrium with nitrogen and oxygen. A twelve percent nitric oxide concentration that cooled gradually to 1000° K. through intermediate temperatures would only have one percent of nitric oxide by the time it had cooled to 2000° K. Very little product would remain at 1000° K. and a negligible amount will exist at standard conditions. On the other hand very rapid cooling is able to "freeze" the equilibrium proportions found at very high temperatures and make available significant concentrations at standard physical conditions of temperature and pressure. To achieve the objective of the most rapid cooling and product extraction, the invention employs special means to remove product gases extremely close to the zone of maximum temperature and in immediate proximity to the radiation absorber on the focal plane of the solar concentrator. Similarily, special means are employed to cool the product gases just as quickly as they have been heated to maximum temperature and before any gradual cooling can take place. To do this a novel cooler is used which will have little effect in hindering the extreme heating of the gas and does not occupy valuable space at the focal plane of the concentrator. Also an objective of the inventive concept is to provide a means of of utilizing the heat removed from the product gas to preheat reactant gases about to enter the intense heating zone at the focal plane. Another objective of the invention is to achieve a significant economy of space in the structure of the system in order to provide a nitrogen fixation apparatus in a small volume near the focal point of a concentrating solar collector. To this end single elements of the invention are to have multiple functions and subordinate systems are to be simplified. For example individual clusters of tubes are to function both as reactant gas preheaters to conserve heat energy and subsequently as product gas coolers. In these simple tubes the very same surfaces which absorb heat from product gases while cooling the product also function to preheat the reactant gases. Also, in place of a heat exchanger which would use separate cooling fluids to cool the product gas, this invention employs the reactant gases as the coolant, but the heat exchange herein is not made in any conventional way through the walls of the heat exchanger from one fluid to another. Rather the reactants first move through the tubes, cooling them then the product is drawn through the same tubes to cool it. In this way the present art is different from nitrogen fixation systems such as the Wielgolaski furnace which used water cooled pipes to cool extremely hot air heated by an arc in a furnace. The present invention more closely resembles the Daniels Process as understood. That process which was developed after Word War 11 at the University of Wisconsin and is also called the "Pebble Process" employed large beds of magnesia pebbles in a regenerative system which conserved heat energy and effected an "equilibrium freeze". In order to reach the temperatures of white heat necessary to fix nitrogen natural gas was burned with air, but the combustion air had to be preheated before combustion. Apparently, the combustion took place in a bed of pebbles and then was rapidly cooled by being moved into a second bed of cooled pebbles. Later the bed of pebbles that produced the cooling of the nitric oxide product became heated in the cooling process and then the heat was used to preheat the combustion air to achieve the extraordinarily high combustion temperatures. However, the combustion products had to be exhausted from the white hot pebbles before air could be reacted on the pebbles to produce nitric oxide and the system was different from the present invention in a number of ways. Rapid cooling was not achieved in the immediate vicinity of the high temperature heating but in an adjacent bed of pebbles. Also the system was based on combustion heating and had complex flow patterns to preheat combustion gas and to separate combustion gas products from the nitric oxide product. Another prior art which relates to one embodiment of this present invention is that described in U.S. Pat. No. 3,421,988 and No. 4,267,027 by E. G. Rochow and J. Amouroux respectively since that art describes the use of catalysts at high temperature for the fixation of nitrogen, but in that former art both electric discharge and heat art used to excite the catalyst; whereas, in this present embodiment heat and light energy are used together to excite the catalyst and react nitrogen with oxygen.

The advantages of the present system for fixing nitrogen by the use of a solar concentrator are numerous. Firstly, it provides a small compact system that can be operated on site in any field or garden wherever a concentrator can be placed and the nitric oxide gas can be inserted directly into the soil to provide an excellent nitrogen fertilizer. Extensive studies by Dr. Hinrich Bohn at the University of Arizona have shown that soil is an excellent absorber of nitric oxide. Secondly, the system can be used in remote areas wherever sunlight is available and, as is the case with all solar energy usage, after construction expense is met, the cost of energy is nonexistent. Finally, because the principal components of the present system are cylindrical in form, and secondary components can easily be mounted into cylinder, the end of the cylinder to receive the concentrated solar radiation from the solar concentrator can be placed at the focus of the concentrator with the length of the cylinder extending along the axis of the concentrator to provide a minimum of obstruction to the light entering the concentrator.

These and other advantages and embodiments will be made clear by referring now to the drawings.

Figure 1:
FIG. 1 of the drawings shows a small, thin metallic tube.

Referring then to FIG. 1 of the drawings, the thin metallic tube 1 is a basic component of the invention in that along with many similar tubes of its type its function is to transport both product and reactant gases, to absorb heat from strongly heated mixtures of product and reactants for purposes of very rapidly cooling the product gases and then to transmit the heat it has absorbed to reactant gases to preheat the reactants at a different time. The tube functions as a heat exchanger of an unconventional type in that while heat is transferred from a hot gas to a cool gas as is the case with traditional heat exchangers, nevertheless, in the present case the heat is not transferred through the walls of the tube from the outside in or from the inside out but rather heat is transferred from a hot gas in the tube to the tube at one time and then subsequently transferred from the tube back to a different, cooler gas flow within the tube. The heating and cooling takes place within each tube of which tube 1 is representative. The other tubes are not shown in this figure as their placement is shown in subsequent drawings. In one embodiment the tube 1 is of tungsten metal and it has a surface which is oxidized by very hot oxygen gas to produce a tungstic oxide coating on its surface. The surface acts as a catalyst to assist in reacting the highly heated nitrogen and oxygen into nitric oxide when these gases are drawn into it. In other embodiments other metals and metal alloys are employed in the composition of the tubes, especially those with rapid heat transfer characteristics and high melting points such as platinum, gold, silver and copper etc. and it is not intended to limit the inventive concept to the use of any particular metal or alloy.

Figure 2:
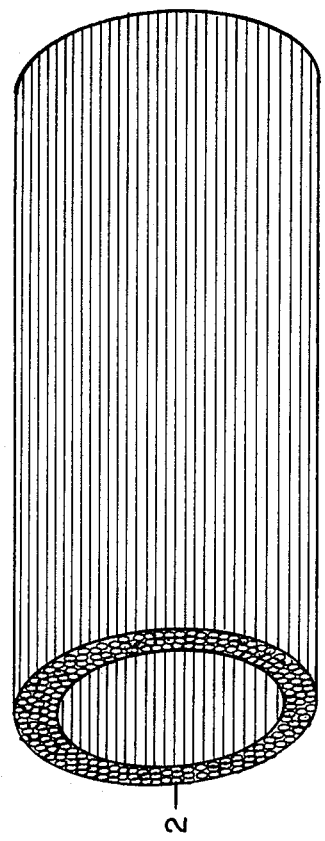
FIG. 2 shows a cluster of tubes like the single tube shown in FIG. 1 and the cluster is in the form of a cylinder.

In FIG. 2 a cluster of tubes is formed in the shape of a cylinder and this cluster 2 is composed of a multiplicity of the single tubes described in FIG. 1.

Figure 3:
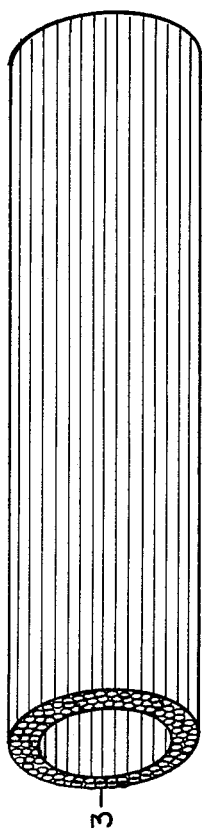
FIG. 3 shows a cluster of the same small, thin tubes like the cluster in FIG. 2, but the cluster shown here is in the form of a smaller cylinder than in FIG. 2.

In FIG. 3 another cluster of tubes is shown resembling cluster 2 in every way as described in FIG. 2, but in this FIG. 3 cluster 3 has a smaller diameter than the one in FIG. 2 to the extent that when 3 is placed within 2 there is sufficient space between the two to permit the innterposition of a ceramic or quartz cylinder between the clusters. The quartz or ceramic cylinders are shown in subsequent drawings. Both clusters 2 and 3 carry reactant gases and product gases and at any given period of time when product gas is moving in one direction in 2 then reactant gas is moving in the opposite direction in 3 and visa versa.

Figure 4:
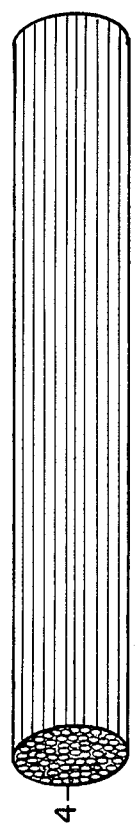
FIG. 4 shows another cluster of small thin metallic tubes, but this cluster is in the form of a rod.

In FIG. 4 the cluster of metal tubes 4 is in the shape of a rod and of sufficiently small diameter as to fit within a ceramic or quartz cylinder that is placed coaxially within cluster 3. The cylinder referred to here is shown subsequently in FIG. 7. The individual tubes of the cluster in FIG. 4 are each as described by tube 1 in FIG. 1. Gas flow within 4 is always in the same direction at any given time as it is in 2 at that time.

Figure 5:
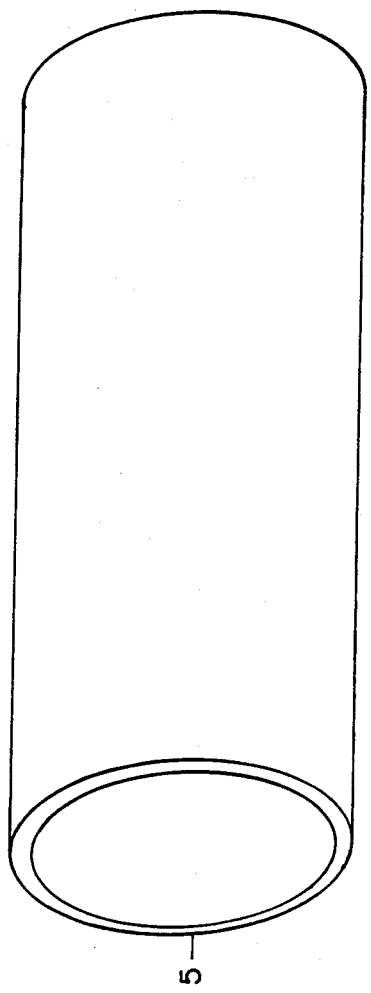
FIG. 5 of the drawings shows a large quartz cylinder.

In FIG. 5 the reactor housing 5 is a cylinder of quartz or refractory ceramic such as alumina, beryllia or silicon carbide. Housing 5 contains the tube clusters 2, 3 and 4 coaxially.

Figure 6:
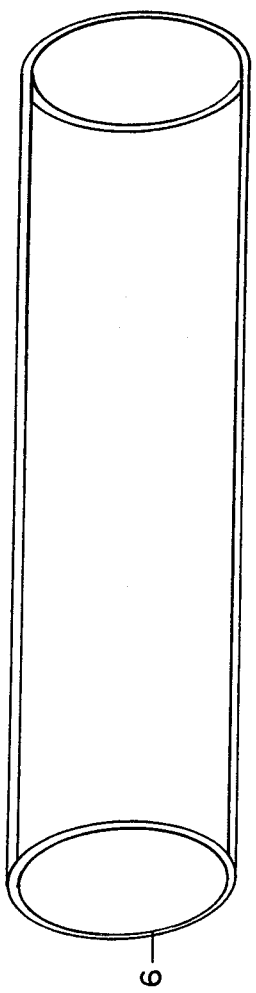
FIG. 6 shows another cylinder similar to the one in FIG. 5 but with a smaller diameter.

Referring to FIG. 6, the cylinder 6 is of the same material as 5 and it separates and supports clusters 2 and 3 when they are mounted within 5.

Figure 7:
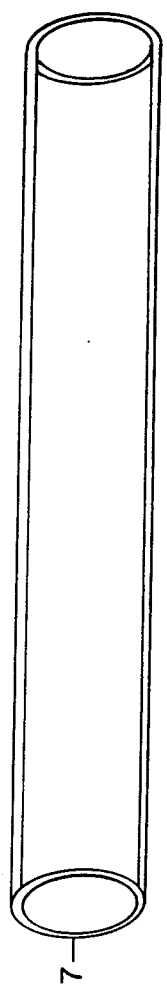
FIG. 7 shows yet another cylinder, but this one is smaller in diameter than the ones shown in the two previous figures.

In FIG. 7 the cylinder 7 serves the same purpose as 6 in that it separates clusters of tubes. In this case 7 separates and supports clusters 3 and 4 when they are mounted within cylinder 6 which is within cluster 2 and cylinder 5.

Figure 8:
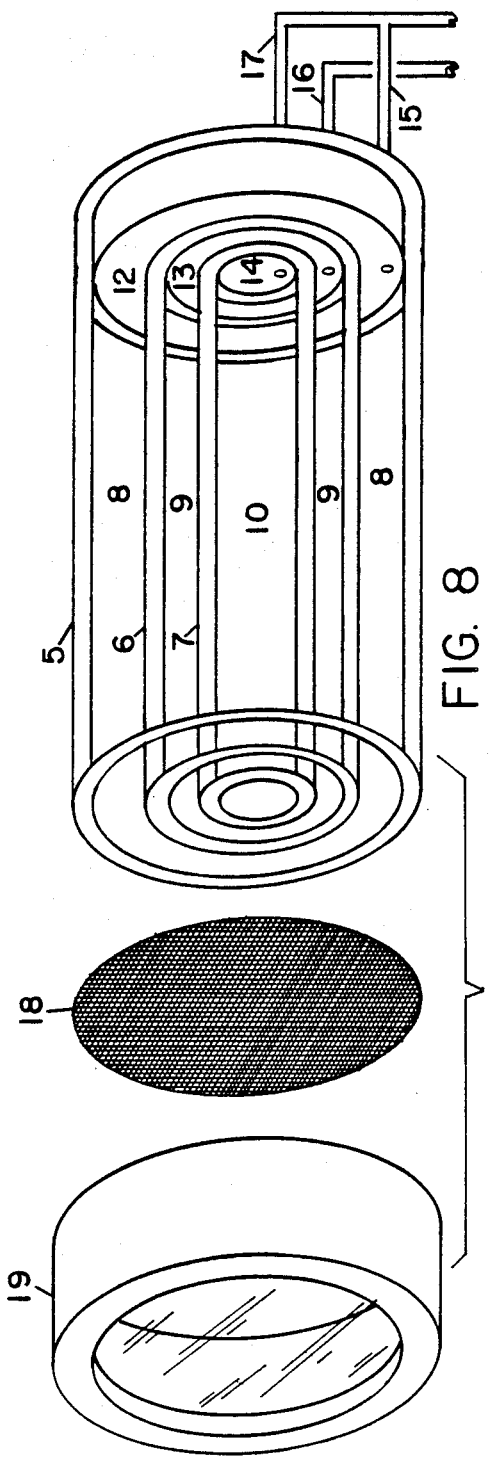
FIG. 8 shows three quartz or ceramic cylinders mounted one inside the other with their diameters forming concentric circles and forming a coaxial array with two cavities between the two outer cylinders, and a cavity in the center of the innermost cylinder, and three seals with gas ducts and tubing for sealing the cavities on their right ends. A screen is shown on the left side of the cylinders.

In FIG. 8 the housing cylinders of FIGS. 5, 6 and 7 are shown mounted coaxially and supported and sealed on their right ends by seals 12, 13 and 14 in order to provide cavities 8, 9 and 10. The duct 14 provides fluid flow communication to cavity 9 through seal 12. Tube duct 16 provides fluid flow to cavity 8 through seal 13. Tube duct 17 provides fluid flow to cavity 10 through seal 14. Cavities 8 and 10 are in immediate parallel fluid flow communication with each other by means of the connection of ducts 15 and 17. Solar absorber screen 18, shown at the left side of the cylinders for clarity of illustration, actually fits tightly up against each cylinder to provide a porous seal on the left side of cavities 8, 9 and 10. In the principal embodiment screen 18 is a screen of tungsten metal, the surface of which quickly oxidizes to tungstic oxide in air when heated white hot by concentrated solar radiation when it is placed on or near the focal point of a concentrating solar collector. In other embodiments other metals and even ceramics are employed for 18. For example metals to be used are tantalum, molybdenum and osmium, but the inventive concept is not limited to metals but porous ceramics are used as well such as those of beryllium oxide, of magnesium oxide, of silicon carbide, of boron carbide etc. In place of screen 18 a thin disc of porous metal or of porous ceramic is employed for absorber 18. The gas flow pattern through the cavities and through the screen is such that gas flow takes place first from cavities 8 and 10 in parallel then through 18 and then through cavity 9 in one period. Then in a second, alternate period the flow is from cavity 9 through 18 and back through 18 and then through 8 and 10 in parallel. The quartz cover 19 admits solar radiation through its lefthand flat surface to 18 and the cover 19 seals the left side opening of cylinder 5 and provides a space between its flat inner surface and solar absorber 18 thereby enabeling gases to circulate from one cavity to another through 18. Because of the very high temperature at which it sublimates porous graphite is also used for 18.

Figure 9:
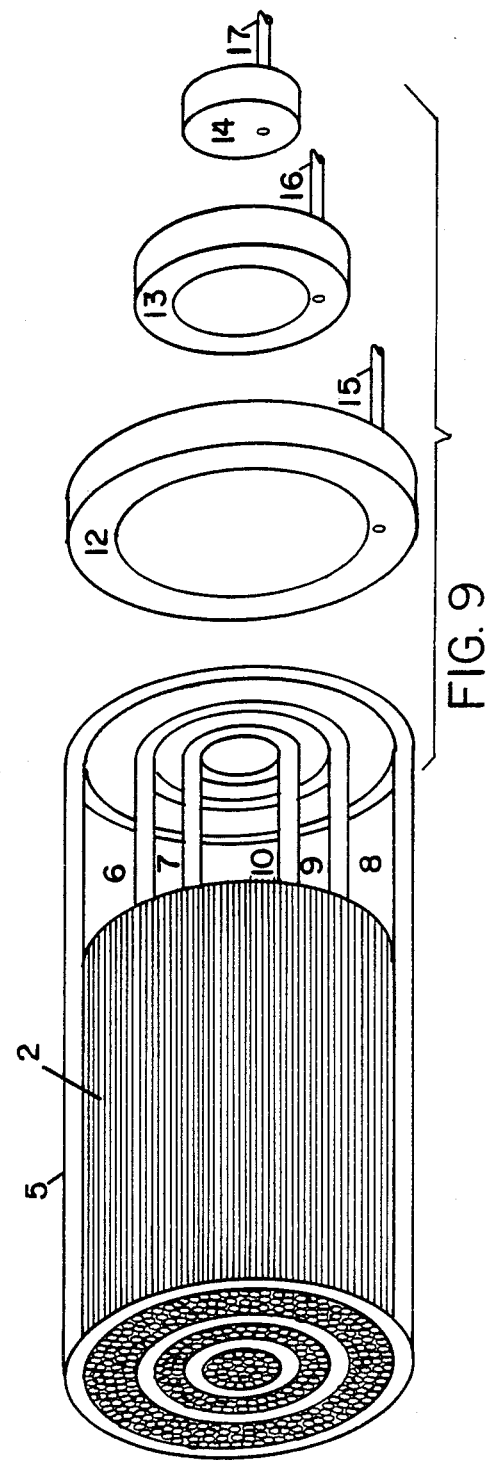
FIG. 9 shows the same three cylinders as in FIG. 8 but with the three clusters of metallic tubes of FIGS. 2, 3 and 4 fitted into the cavities formed between the concentric cylinders of FIG. 8 with the seals that seal and separate the cavities being shown at the right side of the drawing.

In FIG. 9 the clusters of tubes which are shown in FIGS. 2, 3 and 4 by 2, 3 and 4 respectively are placed in cavities 8, 9 and 10 respectively. According to the gas flow described in FIG. 8, which shows the same cavities and cylinders as this FIG. 9, it is to be understood that gas moving through cavity 8 must move through the cluster of tubes 2 which is located in the left side of that cavity. The same is true for cluster 3 with respect to cavity 9 namely that gas entering or leaving 9 must pass through 3. Similarily for cavity 10 with respect to cluster 4. It should be noted especially that, while the clusters of tubes 2, 3 and 4 are on the left side of the cavities, nevertheless these clusters do not extent all of the distance to the extreme lefthand boundaries of these cavities but are recessed slightly inward and to the right of the left side of the cylinders 5, 6 and 7. This position provides a very small space between the clusters of tubes and the screen. The purpose of this positioning is that the screen will not conduct its heat directly to the metal tubes, because it is not allowed to contact the tube clusters. The screen 18, not shown here, does contact the ends of refractory cylinders 5, 6 and 7 but looses little heat to the refractory material due to its low thermal conductivity. For clarity of illustration the seals 12, 13 and 14 are shown separately to the right of the cylinders. The tube ducts 15, 16 and 17 are the same as those shown in FIG. 8. The solar absorber screen 18 is shown in FIG. 8 and is not shown in this FIG. 9 in order to more clearly show the concentric relationship of metal tube clusters 2, 3 and 4 with the cylinders 6 and 7 interposed between the clusters.

Figures 10, 11:
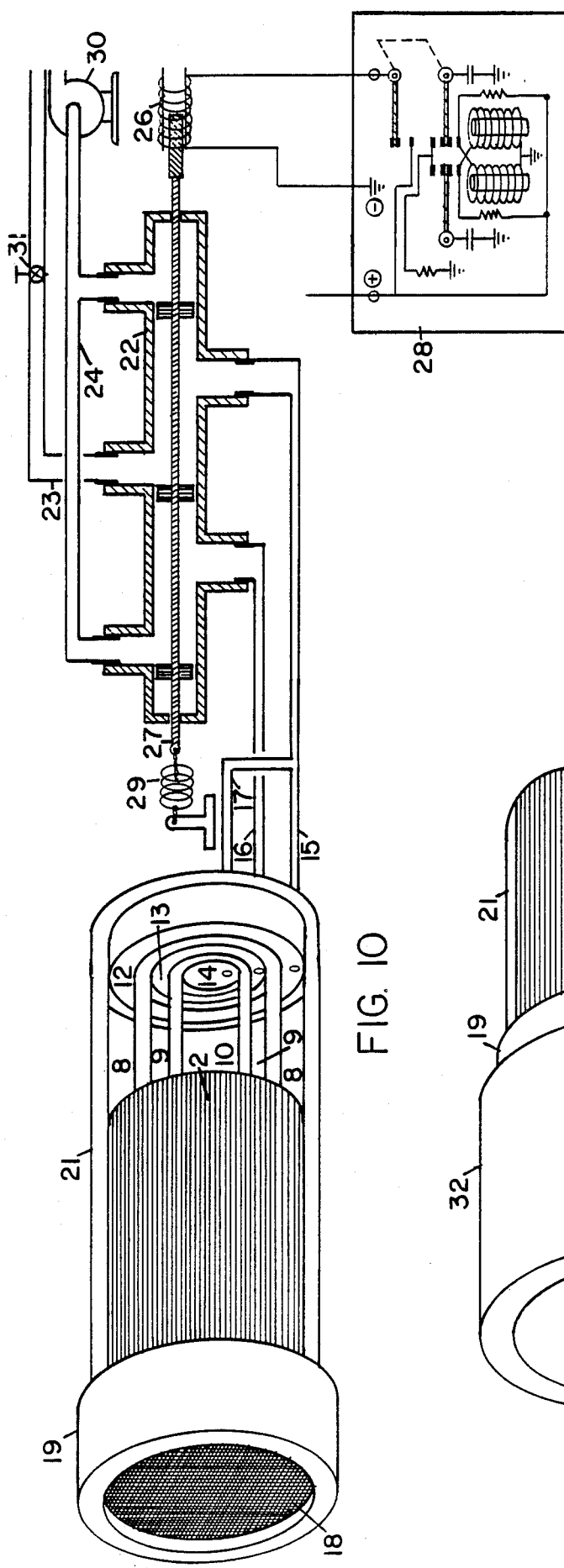
FIG. 10 shows a cylindrical reactor connected to a valve having an actuator and an actuator driver. The valve is connected to a gas supply and a pump.
FIG. 11 shows a short length of cylinder larger in diameter than the previous cylinders of the drawings and this short cylinder is a wind shield.

In FIG. 10 the reactor 21 is the composite of the components shown in the previous figures. Absorber 18 is impinged by concentrated solar radiation at or near the focus of a solar concentrator after the radiation moves through transparent housing cover 19 and a space between 18 and 19. Radiation heats 18 to the temperature of white heat of approximately 2500° C. or more. Gas passing through 18 axially as it circulates from one cluster to another, as described in FIGS. 8 and 9, is heated and reacted into proportions of product compound. Nitric oxide results when nitrogen and oxygen are heated. The product is quickly cooled by a cluster of tubes immediately to the right of the screen 18 but not in physical contact with it. The clusters of tubes, radially inward of 2 are not shown here but have been described in FIG. 9. The spool valve 22 repeatedly reverses gas flow through 21 for the purpose of cooling products and preheating reactants according to the description of FIG. 9. In its present condition shown here in FIG. 10 the spool valve 22 is providing fluid flow communication for reactant gases from reactant inlet duct 23 to cavities 8 and 10 through tube ducts 15 and 17 respectively. Also in the condition shown, spool valve 22 is providing another distinct fluid flow communication from cavity 9 through tube duct 16 to product output duct 24. In its second, alternate condition, which is not shown, spool valve 22 provides fluid flow communication from reactant inlet duct 23 to cavity 9 through tube duct 16. Also in this second condition the valve 23 provides another distinct fluid flow path which is from cavities 8 and 10 through tube ducts 15 and 17 to product output duct 24. Valve actuator 26 repeatedly and at regular intervals changes the condition of valve 22. The change of the condition of 22 from the condition shown to its second, alternate condition, not shown, is accomplished by energizing 26 which pulls valve actuating arm 27 to the right and stretches spring 29. The repeated change of condition of 22 repeatedly reverses the direction of gas flow through 21 but maintains a unidirectional flow from reactant inlet duct 23 and it also maintains a unidirectional flow of gas to product output duct 24. The effect of the repeated directional reversal of flow through 21 is that first one then the other set of tubes, shown in FIG. 9, is being cooled by reactant gases and alternately one then the other set of tubes is cooling the gases heated on screen 18 according to the flow patterns described in FIGS. 8 and 9. Controllable frequency oscillator 28 periodically and repeatedly excites and the deenergizes 26 to change the condition of 22 repeatedly and at regular time intervals. The rate of oscillation is determined experimentally and is dependent upon gas flow rate, the intensity of solar radiation on a given day, the size of screen 18 and the concentration ratio of the solar concentrator etc. If the rate of gas direction reversal is too slow, the tubes employed for cooling during one half cycle will overheat. Then a gradual cooling will take place and the equilibrium percentage of product in the cooled mixture will decline. An excessively rapid rate of reversal will prevent full evacuation of product gas into the product output duct 24 and excessive product gas will be reversed back in direction to the screen 18 and unnecessarily reheated. In the principal embodiment the oscillator 28 is a relay oscillator which provides an approximately square wave output having equal periods it which it supplies current and puts out no current. In other embodiments other interrupter circuits are employed to provide the periodic current necessary to alternate 22 back and forth between its two conditions. In one embodiment 28 is an astable multivibrator with an amplifier to drive solenoid 26. Rotating commutators with brushes that contact the commutator periodically for half of the time while making no contact for the other half of the time can be used in another embodiment as well as rotory cam shafts that periodically engage and close switching points. The multivibrator and rotating interrupter systems are not shown as they are well understood in the art. Also in the principal embodiment the reactant inlet duct 23 carries stoichiometric proportions of nitrogen and oxygen to produce nitric oxide but other proportions are to be used as well and two parts of oxygen to one part of nitrogen are used in 23. Even the proportions of nitrogen and oxygen found in air are suitable, and one part of oxygen to four parts of nitrogen are used in some embodiments, but is not intended to limit the invention to certain proportions of reactants. Because of the very rapid cooling achieveable nitrogen and water vapor are reacted to provide ammonia. Ammonia production is enhanced by the use of photocatalytic material on the screen 18 as well as on the surfaces of the cooling tubes. In this embodiment titanium dioxide which has previously been used at low light intensities is now used at very high light intensities in conjunction with the heat generated at the focus of a solar concentrator. In this embodiment a titanium screen is employed which has its surface oxidized to titanium dioxide or the absorber is a porous ceramic containing tungstic oxide or titanium dioxide. The vacuum pump 30 draws reactants and products through the system and is connected to product output duct 24 on its downstream end. The pressure regulator valve 31 is used to regulate the gas flow rate through reactor 21 and to control the depth of the vacuum in 21 in those embodiments having reduced pressure in 21. In each embodiment valve 31 is used to regulate the gas flow rate through 21 in conjunction with the pump 30. The gas flow rate is controlled to provide adequate heating of the gas to approximately 2500° C. or more, while avoiding an excessive rate of heat transfer from 18 as to cool 18 to a degree at which little combined nitrogen could form. While the gas flow rate is limited by the intensity and quantity of solar radiation available on 18 the invention is not inherently limited to any particular pressure or vacuum within the reactor 21 and 21 may be operated effectively from one sixth of an atmosphere to several atmospheres. In the principal embodiment it is operated at one atmosphere approximately.

Because the intensity of solar radiation must be very great on 18 to achieve the required gas temperatures, even the flat quartz plate of cover 19 absorbs and reflects much solar energy in spite of the fact that it is transparent. To avoid the energy losses caused by the passage of radiation through 19 before it arrives at 18, one embodiment of the invention functions without the quartz transparent end plate on 19. In place of this end plate a second pump, not shown, is connected to the upstream end of inlet duct 23. The gas pressure from this pump forces reactants out through 18 from one set of tube clusters while at the same time vacuum pump 30 provides a draft through the alternate set of tube clusters to draw the reactants back through 18 and into that alternate set of tubes. In this embodiment housing cover 19 is not sealed to housing cylinder 5 in such a way as to provide pressure integrity across the left side of reactor 2 as it is in other embodiments. In this embodiment there is no need for pressure integrity in the space to the left of absorber 18 because the gas moving to the left and outward through 18 is drawn back through another section of 18 by the draft produced by 30. The reactant gas moving leftward through one set of tube ducts cools the ducts in this embodiment just as it does in other embodiments. Similarily, the heated gas moving to the right after being heated by 18 is cooled by the ducts just as it is in other embodiments, but there is no transparent pressure seal at the end of 21 to diminish the intensity of concentrated solar radiation impinging 18. In this embodiment the heat transfer tube ducts are the same as those in FIGS. 2, 3, 4 and 9.

In FIG. 11 the cylindrical wind shield 32 fits coaxially over the end of cover 19 when the transparent end plate of 19 is removed as in the embodiment described immediately above. The function of 19 is described in FIG. 10. A portion of the length of 32 extends to the left of 19 to prevent the movement of ambient air from cooling screen 18. The fit of 32 to 19 is a simple press fit in that the inner diameter of the wall of 32 is only very slightly larger than the outer diameter of 19 allowing 32 to slide over 19 when strongly pressed.

While the spool valve is an effective and simple way of repeatedly reversing the gas flow through the chemical reactor 21 for preheating the reactants and cooling the products as described in FIG. 10 by valve 22, it is not intended to limit the basic inventive concept to the use of a spool valve alone, but any valving capable of repeatedly reversing the gas flow through the reactor 21 while retaining a unidirectional flow from a source of reactants and to a product output duct is in accord with the invention. A network of single electric valves is described in my copending patent application called, "Plasma Nitrogen Fixation with Short Path Heat Transfer". In FIG. 7 of that application four simple solenoid actuated valves are operated in a network to alternate the direction of flow through a plasma chamber and in one embodiment a spool valve is used as well.

I claim:

1. A solar powered chemical reactor for reacting nitrogen and other reactants to provide products of combined compounds comprising;
  (1) a primary solar energy gas heater in the form of porous material in physical contact with a flow of gases being heated and flowing through the pores of the material, said porous material being capable of absorbing intense concentrated solar radiation and of converting said radiation to thermal energy, and
  (2) rapidly acting, double heat transfer means each of which means being capable of contacting said gas flow immediately after leaving said pores and of immediately absorbing heat energy from the gas flow in order to fix the equilibrium percentage of combined compound products formed at the temperatures of the absorber in a first time period, said heat transfer means in a second, alternate time period each being also capable of transferring said heat absorbed from solar heated gases to reactant gases about to be heated by said primary gas heater, each one of said double heat transfer means being capable of acting alternately in time with the other heat transfer means, and each of said heat transfer means being in the form of a set of metal tubes with open ends immediately adjacent to but not contacting said porous absorber, said tubes being capable of providing fluid flow communication between the solar absorber and
  (3) a gas flow direction reversal means in the form of electric valving and a valve current interrupter capable of intermittently energizing said valving thereby to repeatedly alternate said valving between two conditions, one condition being the provision of series fluid flow communication from a source of gas reactants through a first set of heat transfer tubes and a solar absorber to a second set of heat transfer tubes and to a product output duct, the second valve condition being the provision of series fluid flow communication from the source of reactant gases through the second set of heat transfer tubes and then through the solar absorber and through the first set of heat transfer tubes and then to the product output duct, and
  (4) a multiple chamber, heat resistant housing having seals with conduit ports on one end, said housing being capable of supporting the sets of heat transfer tubes in separate cavities and of directing gas flow through said sets of tubes and through said solar radiation absorber in such a manner that said housing provides series fluid flow communication through one set of heat transfer tubes then the absorber and the other set of tubes, (5) reactant and product gas circulation means in the form of a vacuum/pressure pump capable of moving gas from a source, through said valving for repeatedly reversing flow direction, through the heat transfer tubes and absorber and into an output duct.

2. A solar powered chemical reactor for reacting nitrogen as in claim 1 in which the electric valving and valve current interrupter is a spool valve actuated by an electric solenoid said valve having three spools with each spool being capable of two positions thereby providing two distinct valve conditions, each condition providing two separate fluid paths each of which paths is the result of a selection between two possible alternate ports and a third common port, in one first condition, one of the two separate paths being capable of providing a fluid flow between a reactant gas inlet duct and one, first set of heat transfer tubes while at the same time the other separate path provides fluid flow between a product outlet duct and the second set of heat transfer tubes, and in the second, alternate valve condition, the separate paths being reversed, one path being capable of providing fluid flow between a product inlet duct and the second set of heat transfer tubes while the other separate path is capable of providing fluid flow between the product output duct and the first set of heat transfer tubes, and in which the automatic valve current interrupter is a relay oscillator capable of repeatedly and intermittently providing periods of power to actuate the valve solenoid followed by periods of equal duration in which no power flows to the solenoid.

3. A solar powered chemical reactor as in claim 1 in which the primary solar energy gas heater is also a photocatalytic reactor in the form of a porous absorber coated with photocatalytic material capable of reacting nitrogen with other reactants under the influence of high intensity solar radiation.

4. A solar powered chemical reactor as in claim 1 in which the primary solar energy gas heater is a screen of tungsten metal having a surface coating of tungstic oxide.

5. A chemical reactor as in claim 1 in which the two sets of heat transfer tubes are composed of tubes of tungsten metal the surface of which is oxidized to tungstic oxide capable of providing catalytic action on gas reactants in the form of nitrogen and oxygen to produce nitric oxide.

6. A solar powered chemical reactor as in claim 1 in which the valve current interrupter is a relay oscillator periodically making and breaking a current flow to the valve actuating solenoid.

7. A chemical reactor as in claim 1 in which the valve current interrupter capable of providing intermittent periods of equal duration of current and the absence of current is an astable multivibrator periodically energizing the valve actuating solenoid.

8. A chemical reactor as in claim 1 in which the solar absorber and primary gas heater is porous material selected from a group of materials consisting of tantalum, molybdenum, tungsten, osmium and graphite.

9. A chemical reactor as in claim 1 in which the solar radiation absorber is a porous ceramic.

10. A chemical reactor as in claim 1 in which the absorber converting solar radiation to thermal energy is a metal screen made from metals selected from a group consisting of tantalum, tungsten, molybdenum and osmium.

11. A chemical reactor as in claim 1 in which the reactant gases are oxygen and nitrogen and the product is nitric oxide.

12. A chemical reactor as in claim 1 in which the reactant gases are nitrogen and water vapor and the product is ammonia.

13. A chemical reactor as in claim 1 in which the absorber is a porous ceramic containing titanium dioxide.

14. A chemical reactor as in claim 1 in which the solar absorber is a porous ceramic containing tungstic oxide.

15. A solar powered chemical reactor for reacting nitrogen and other reactants to provide products of combined compounds comprising;

(1) a primary solar energy gas heater in the form of porous material in physical contact with a flow of gases being heated and flowing through the pores of the material, said porous material being capable of absorbing intense concentrated solar radiation and of converting said radiation to thermal energy, and (2) rapidly acting, double heat transfer means each of which means being capable of contacting said gas flow immediately after leaving said pores and of immediately absorbing heat energy from the gas flow in order to fix the equilibrium percentage of combined compound products formed at the temperatures of the absorber in a first time period, said heat transfer means in a second, alternate time period each being also capable of transferring said heat absorbed from solar heated gases to reactant gases about to be heated by said primary gas heater, each one of said double heat transfer means being capable of acting alternately in time with the other heat transfer means, and each of said heat transfer means being in the form of a set of metal tubes with open ends immediately adjacent to, but not contacting, said porous absorber, said tubes being capable of providing fluid flow communication between the solar absorber and (3) a gas flow direction reversal means in the form of electric valving and a valve current interrupter capable of intermittently energizing said valving thereby to repeatedly alternate said valving between two conditions, one condition being the provision of series fluid flow communication from a source of gas reactants through a first set of heat transfer tubes and a solar absorber, and a fluid flow communication from a second set of the heat transfer tubes to a product output duct, the second valve condition providing series fluid flow communication from the source of reactant gases through the second set of heat transfer tubes to the solar absorber, and a fluid flow communication from the solar absorber through the first set of heat transfer tubes to the product output duct, and (4) a multiple chamber, heat resistant housing having seals with ports for ducts on one end, said housing being capable of supporting the sets of heat transfer tubes in separate cavities and of directing gas flow through said sets of tubes and through said radiation absorber in such a manner that said housing provides fluid flow communication through one set of heat transfer tubes and the absorber and fluid flow communication between the other set of tubes and the absorber, and (5) reactant and product gas circulation means in the form of a vacuum pump in fluid flow communication with the downstream end of the product exit duct and a gas pressure pump in fluid flow communication with the upstream end of the reactant inlet duct, said pumps being capable of moving a flow of gas from a source, through said valving, through one set of heat transfer ducts and through the absorber, then again back through the absorber, through another set of heat transfer tubes, through the valving and into the output duct, and (6) a wind shield partially enclosing the solar absorber except in the area through which converging radiation from a solar concentrator passes toward the concentrator, said shield being capable of impeding the movement of ambient air from disrupting the flow of reactant gases at the solar absorber.

* * * * *